United States Patent
Yamaguchi et al.

(10) Patent No.: US 7,322,341 B2
(45) Date of Patent: Jan. 29, 2008

(54) CONTROL SYSTEM FOR INTERNAL COMBUSTION ENGINE

(75) Inventors: Satoshi Yamaguchi, Wako (JP); Mamoru Hasegawa, Wako (JP); Naoto Kitayama, Wako (JP); Hideki Sakamoto, Wako (JP); Akira Odajima, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/492,101

(22) Filed: Jul. 25, 2006

(65) Prior Publication Data
US 2007/0044759 A1 Mar. 1, 2007

(30) Foreign Application Priority Data
Aug. 25, 2005 (JP) ............................. 2005-243569

(51) Int. Cl.
F02D 41/40 (2006.01)
F02D 1/02 (2006.01)

(52) U.S. Cl. .................... 123/435; 123/27 R; 123/294; 123/478; 123/501

(58) Field of Classification Search .............. 123/27 R, 123/294, 357, 435, 478, 480, 501, 502, 568.21
See application file for complete search history.

(56) References Cited

U.S. PATENT DOCUMENTS

| | | | | |
|---|---|---|---|---|
| 4,722,310 A | | 2/1988 | Igashira et al. | |
| 6,283,096 B1 | * | 9/2001 | Kimura | 123/501 |
| 6,606,979 B2 | * | 8/2003 | Kimura | 123/500 |
| 7,201,138 B2 | * | 4/2007 | Yamaguchi et al. | 123/305 |
| 2004/0177830 A1 | | 9/2004 | Yamaoka et al. | |
| 2007/0012290 A1 | * | 1/2007 | Yamaguchi et al. | 123/478 |

FOREIGN PATENT DOCUMENTS

| EP | 0 905 361 A2 | 3/1999 |
|---|---|---|
| EP | 1 445 456 A2 | 8/2004 |
| JP | 63-080071 A | 4/1988 |
| JP | 2004-100566 A | 4/2004 |

\* cited by examiner

*Primary Examiner*—T. M Argenbright
(74) *Attorney, Agent, or Firm*—Arent Fox LLP (57) ABSTRACT

A control system for an internal combustion engine having a fuel injection valve. A fuel injection timing is determined according to the detected engine operating condition. A target ignition timing of the fuel is calculated using a plurality of maps that store the target ignition timings according to the engine operating condition and an actual ignition timing of the fuel is detected. An ignition delay of the actual ignition timing with respect to the target ignition timing is calculated. The cetane number of the fuel is estimated according to the calculated ignition delay. The map to be used in calculating the target ignition timing is switched according to the estimated cetane number.

10 Claims, 9 Drawing Sheets

FIG. 10A INJP

FIG. 10B INJM

| ESTIMATED CETANE NUMBER | CETANE NUMBER OF REFUELED FUEL | | | |
|---|---|---|---|---|
| | CET1 | CET2 | CET3 | CET4 |
| CET1 | NOx 6% INCREASE PM 80% DECREASE | COMBUSTION NOISE | LARGE COMBUSTION NOISE | LARGE COMBUSTION NOISE |
| CET2 | LARGE Pmi CHANGE RATE | NOx 10% DECREASE PM 70% DECREASE | COMBUSTION NOISE | LARGE COMBUSTION NOISE |
| CET3 | MISFIRE | LARGE Pmi CHANGE RATE | NOx 10% DECREASE PM 70% DECREASE | COMBUSTION NOISE |
| CET4 | MISFIRE | MISFIRE | LARGE Pmi CHANGE RATE | DISIGNED PERFORMANCE |

CONTROL SYSTEM FOR INTERNAL COMBUSTION ENGINE

BACKGROUND OF THE INVENTION

1. Field of the Invention

The present invention relates to a control system for an internal combustion engine, and particularly, to a system for controlling an internal combustion engine according to a pressure in the cylinder detected by a cylinder pressure sensor.

2. Description of the Related Art

Japanese Patent Laid-open No. 2004-100566 (JP '566) discloses a fuel injection control apparatus in which the cylinder pressure (pressure in the combustion chamber) is detected by a cylinder pressure sensor. A fuel injection amount, a fuel injection timing, and the like, are controlled according to the detected cylinder pressure. According to the disclosed apparatus, the crank angle Cmax at which the cylinder pressure reaches a maximum value is detected, and the fuel injection timing is corrected so that the detected crank angle Cmax coincides with a target value which is previously set according to the engine operating condition.

If the internal combustion engine is a diesel engine, an actual ignition timing changes depending on the cetane number of the fuel being used, even if the fuel injection timing is the same. Therefore, the control used by the above-described conventional apparatus is effective when the combustion characteristic of the fuel changes.

However, a specific method for correcting the fuel injection timing is not shown in JP '566. For example, if the cylinder pressure is to be detected during comparatively short periods of time and control is to be performed based on the detection results, the calculation load on the control apparatus increases. Accordingly, correction of the fuel injection timing must be performed without excessively increasing the calculation load on the control apparatus. However, the apparatus shown in JP '566 is not configured in contemplation of such a situation.

SUMMARY OF THE INVENTION

The present invention was attained contemplating the above-described points, and an aspect of the present invention is to provide a control system for an internal combustion engine which detects an actual ignition timing of fuel based on the cylinder pressure detected by the cylinder pressure sensor and which appropriately performs the correction of the fuel injection timing according to the detected actual ignition timing, wherein any increase in the calculation load is suppressed.

To attain the above-described aspect, the present invention provides a control system for an internal combustion engine having a fuel injection means provided in a combustion chamber of the engine for injecting fuel into the combustion chamber. The control system includes operating condition detecting means, fuel injection control means, a plurality of target ignition timing storing means, ignition timing detecting means, target ignition timing calculating means, cetane number estimating means, and target ignition timing switching means. The operating condition detecting means detects an operating condition of the engine. The fuel injection control means determines a fuel injection timing (CAIM) according to the detected engine operating condition and executes fuel injection through the fuel injection means. A plurality of the target ignition timing storing means stores target ignition timings (CAFMM1-CAFMM4) of the fuel being injected into the combustion chamber. The target ignition timings are set according to the operating condition of the engine. The ignition timing detecting means detects an actual ignition timing (CAFM) of the fuel injected into the combustion chamber. The target ignition timing calculating means calculates the target ignition timing (CAFMM1-CAFMM4) using the plurality of target ignition timing storing means. The cetane number estimating means calculates an ignition delay (DCAM) of the actual ignition timing (CAFM) with respect to the target ignition timing (CAFMM1-CAFMM4) and estimates a cetane number (CETLRN) of the fuel according to the calculated ignition delay (DCAM). The target ignition timing switching means switches the target ignition timing storing means to be used by the target ignition timing calculating means according to the estimated cetane number (CETLRN). In the present invention, the "ignition timing" means the compression ignition timing that is a timing of ignition caused not by the spark plug but by the compression of the air-fuel mixture.

With the above-described configuration, the target ignition timing is calculated using the target ignition timing storing means which stores the target ignition timings of the fuel injected into the combustion chamber, wherein the target ignition timings are set according to the operating condition of an engine, the actual ignition timing is detected, and the ignition delay of the actual ignition timing with respect to the target ignition timing is calculated. Further, the cetane number of the fuel is estimated according to the calculated ignition delay, wherein the target ignition timing storing means is switched according to the estimated cetane number. By switching the plurality of target ignition timing storing means according to the estimated cetane number, the cetane number is always estimated using the target ignition timing most suitable for the fuel being used. Consequently, the cetane number is quickly estimated with comparatively little operation load.

Preferably, the control system further includes a plurality of fuel injection timing correction amount storing means, fuel injection timing correction amount calculating means, and fuel injection timing correction amount switching means. The plurality of the fuel injection timing correction amount storing means stores correction amounts (CADM1-CADM3) of the fuel injection timing. The correction amounts are set according to the operating condition of the engine. The fuel injection timing correction amount calculating means calculates the correction amount (CADM1-CADM3) of the fuel injection timing using the fuel injection timing correction amount storing means. The fuel injection timing correction amount switching means switches the fuel injection timing correction amount storing means to be used by the fuel injection timing correction amount calculating means according to the estimated cetane number (CETLRN). The fuel injection control means executes the fuel injection at the fuel injection timing (CAIM) corrected with the correction amount (CADM1-CADM3) calculated by the fuel injection timing correction amount calculating means.

With the above-described configuration, the correction amount of the fuel injection timing is calculated using the fuel injection timing correction amount storing means which stores correction amounts of the fuel injection timing that are set according to the operating condition of the engine. Also, the fuel injection timing correction amount storing means to be used for calculating the fuel injection timing correction amount is switched according to the estimated cetane number. The fuel injection is executed at the fuel injection timing corrected with the correction amount calculated by the fuel injection timing correction amount calculating means. By switching the plurality of fuel injection timing correction amount storing means according to the estimated cetane number, the fuel injection timing is always corrected using the fuel injection timing correction amount most suitable for the fuel being used. Consequently, the fuel injection timing is appropriately corrected according to the estimated cetane number with comparatively little operation load.

Further, the present invention provides another control system for an internal combustion engine having fuel injection means provided in a combustion chamber of the engine for injecting fuel into the combustion chamber. The control system includes operating condition detecting means, fuel injection control means, target ignition timing storing means, ignition timing detecting means, target ignition timing calculating means, cetane number estimating means, a plurality of fuel injection timing correction amount storing means, fuel injection timing correction amount calculating means, and the fuel injection timing correction amount switching means. The operating condition detecting means detects an operating condition of the engine. The fuel injection control means determines a fuel injection timing (CAIM) according to the detected engine operating condition and executes fuel injection through the fuel injection means. The target ignition timing storing means stores target ignition timings (CAFMM1-CAFMM4) of the fuel being injected into the combustion chamber. The target ignition timings are set according to the operating condition of the engine. The ignition timing detecting means detects an actual ignition timing (CAFM) of the fuel injected into the combustion chamber. The target ignition timing calculating means calculates the target ignition timing (CAFMM1-CAFMM4) using the target ignition timing storing means. The cetane number estimating means calculates an ignition delay (DCAM) of the actual ignition timing (CAFM) with respect to the target ignition timing (CAFMM1-CAFMM4) and estimates a cetane number (CETLRN) of the fuel according to the calculated ignition delay (DCAM). The plurality of fuel injection timing correction amount storing means stores correction amounts (CADM1-CADM3) of the fuel injection timing. The correction amounts are set according to the operating condition of the engine. The fuel injection timing correction amount calculating means calculates the correction amount (CADM1-CADM3) of the fuel injection timing using the fuel injection timing correction amount storing means. The fuel injection timing correction amount switching means switches the fuel injection timing correction amount storing means to be used by the fuel injection timing correction amount calculating means according to the estimated cetane number (CETLRN). The fuel injection control means executes the fuel injection at the fuel injection timing (CAIM) corrected with the correction amount (CADM1-CADM3) calculated by the fuel injection timing correction amount calculating means.

With the above-described configuration, the target ignition timing is calculated using the target ignition timing storing means which stores the target ignition timings of the fuel injected into the combustion chamber, the target ignition timings being set according to the operating condition of the engine. The actual ignition timing is detected and the ignition delay of the actual ignition timing with respect to the target ignition timing is calculated.

Further, the cetane number of fuel is estimated according to the calculated ignition delay. The correction amount of the fuel injection timing is calculated using the fuel injection timing correction amount storing means which stores the correction amount of the fuel injection timing that is set according to the operating condition of the engine. Also, the fuel injection timing correction amount storing means to be used for calculating the fuel injection timing correction amount is switched according to the estimated cetane number.

Then, fuel injection is executed at the fuel injection timing corrected by the correction amount calculated by the fuel injection timing correction amount calculating means. By switching the plurality of fuel injection timing correction amount storing means according to the estimated cetane number, the fuel injection timing is always corrected using the fuel injection timing correction amount most suitable for the fuel being used.

Consequently, the fuel injection timing is appropriately corrected according to the estimated cetane number with comparatively little operation load. By providing a sufficient number of the fuel injection timing correction amount storing means corresponding to almost all fuels of various cetane numbers distributed in the market, any increase in combustion noise and/or change in the combustion state, or misfire after refueling is quickly suppressed, regardless of the fuel with which the engine has been refueled.

Preferably, the ignition timing detecting means corrects the actual ignition timing (CAFM) based on an air-fuel ratio (AF) of an air-fuel mixture in the combustion chamber.

With the above-described configuration, the actual ignition timing is corrected based on the air-fuel ratio of the air-fuel mixture in the combustion chamber. The detected actual ignition timing includes a detection error due to a difference in the air-fuel ratio. Accordingly, a more accurate actual ignition timing is obtained by correcting the detected ignition timing based on the air-fuel ratio.

DETAILED DESCRIPTION OF THE PREFERRED EMBODIMENTS

Preferred embodiments of the present invention will now be described with reference to the drawings.

Figure 1:
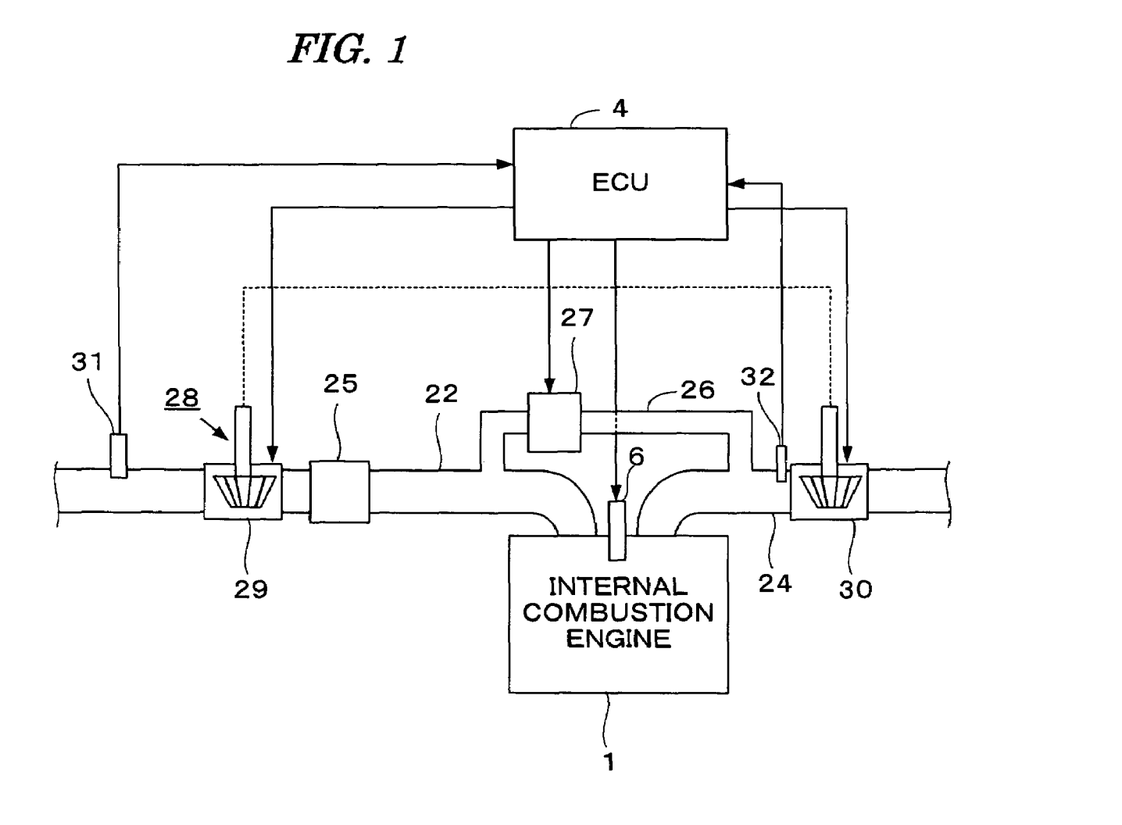
FIG. 1 is a schematic diagram illustrating an internal combustion engine and a control system therefor according to one embodiment of the present invention.
Figure 2:
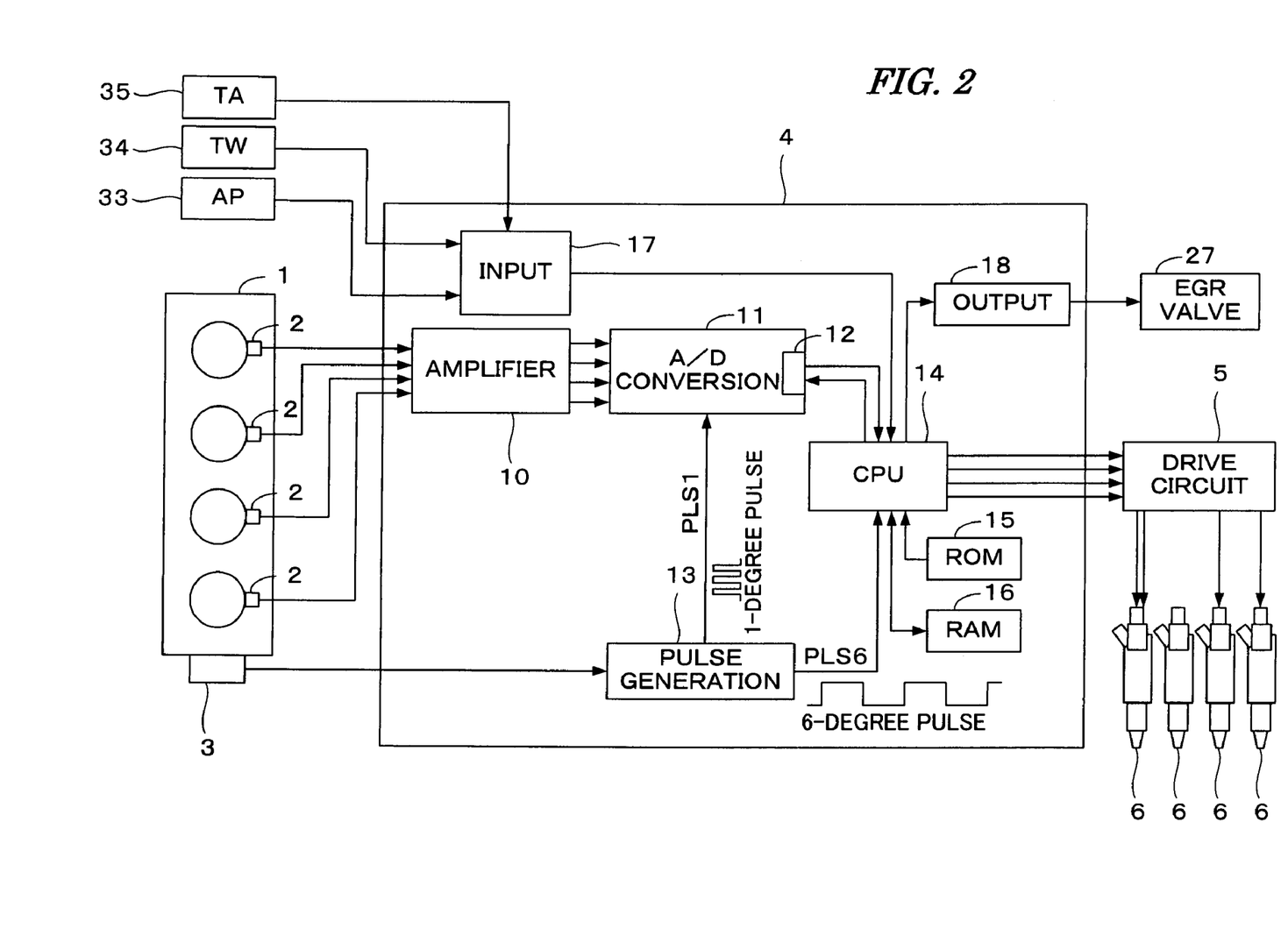
FIG. 2 is a schematic diagram illustrating a configuration of a part of the control system illustrated in FIG. 1.

FIGS. 1 and 2 are schematic diagrams illustrating a configuration of an internal combustion engine and a control system therefor according to one embodiment of the present invention. The internal combustion engine 1 (hereinafter referred to as "engine"), which has four cylinders, is a diesel engine, wherein fuel is injected directly into the cylinders. Each cylinder is provided with a fuel injection valve 6 electrically connected to an electronic control unit 4 (hereinafter referred to as "ECU 4"). The ECU 4 controls a valve opening period and a valve opening timing of each fuel injection valve 6. That is, the fuel injection period and fuel injection timing are controlled by the ECU 4.

The engine 1 has an intake pipe 22, an exhaust pipe 24, and a turbocharger 28. The turbocharger 28 includes a turbine 30 and a compressor 29. The turbine 30 is driven by the kinetic energy of exhaust gases. The compressor 29, which is rotationally driven by the turbine 30, compresses the intake air of the engine 1.

The turbine 30 has a plurality of movable vanes (not shown) and is configured to adjust the rotational speed of the turbine 30 by changing an opening of the movable vanes (hereinafter referred to as "vane opening"). The vane opening of the turbine 30 is electromagnetically controlled by the ECU 4.

The intake pipe 22 is located on the downstream side of the compressor 29 and is provided with an intercooler 25 which cools pressurized air.

An exhaust gas recirculation passage 26 is located between the upstream side of the turbine 30 in the exhaust pipe 24 and the intake pipe 22. The exhaust gas recirculation passage 26 is provided with an exhaust gas recirculation control valve 27 (hereinafter referred to as "EGR valve") that controls the amount of exhaust gases that are recirculated. The EGR valve 27 is an electromagnetic valve having a solenoid. A valve opening of the EGR valve 27 is controlled by the ECU 4.

The intake pipe 22 is provided with an intake air flow rate sensor 31 for detecting an intake air flow rate GA, and the exhaust pipe 24 is provided with an oxygen concentration sensor 32. The detection signals of both sensors 31 and 32 are supplied to the ECU 4.

Each cylinder of the engine 1 is provided with a cylinder pressure sensor 2 for detecting a cylinder pressure (a pressure in the combustion chamber of the engine 1). In this embodiment, the cylinder pressure sensor 2 is configured in one body together with a grow plug disposed in each cylinder. The detection signal of the cylinder pressure sensor 2 is supplied to the ECU 4. It is to be noted that the detection signal of the cylinder pressure sensor 2 corresponds to a differential signal of the cylinder pressure PCYL with respect to the crank angle (time). The cylinder pressure PCYL is obtained by integrating the output of the cylinder pressure sensor.

The engine 1 is provided with a crank angle position sensor 3 for detecting a rotation angle of the crankshaft (not shown) of the engine 1. The crank angle position sensor 3 generates one pulse at every 1 degree of the crank angle, and the pulse is supplied to the ECU 4. The crank angle position sensor 3 further generates a cylinder discrimination pulse at a predetermined crank angle for a specific cylinder of the engine 1, and then supplies the cylinder discrimination pulse to the ECU 4.

An accelerator sensor 33 for detecting an operation amount AP of the accelerator pedal of the vehicle driven by the engine 1, a coolant temperature sensor 34 for detecting a coolant temperature TW of the engine 1, an intake air temperature sensor 35 for detecting an intake air temperature TA of the engine 1, a boost pressure sensor (not shown) for detecting an intake pressure (boost pressure) on the downstream side of the turbocharger 28, and a vehicle speed sensor (not shown) for detecting a vehicle speed VP of the vehicle are connected to the ECU 4. The detection signals of these sensors are supplied to the ECU 4.

A control signal of the fuel injection valve 6 located in the combustion chamber of each cylinder of the engine 1 is provided by the ECU 4 to a drive circuit 5. The drive circuit 5 is connected to the fuel injection valves 6 and supplies drive signals according to the control signal from the ECU 4 to the fuel injection valves 6. Fuel is injected into the combustion chamber of each cylinder based on a fuel injection timing in accordance with a control signal that is output by the ECU 4. The amount of fuel that is injected is controlled to a value in accordance with the control signal from the ECU 4.

The ECU 4 includes an amplifier 10, an A/D conversion block 11, a pulse generation block 13, a CPU (Central Processing Unit) 14, a ROM (Read Only Memory) 15 for storing programs executed by the CPU 14, a RAM (Random Access Memory) 16 for storing calculation results, and the like, an input circuit 17, and an output circuit 18. The detection signal of the cylinder pressure sensor 2 is input to the amplifier 10. The amplifier 10 amplifies the input signal. The signal amplified by the amplifier 10 is then input to the A/D conversion block 11. The pulse signal output from the crank angle position sensor 3 is input to the pulse generation block 13.

The A/D conversion block 11, which includes a buffer 12, converts the cylinder pressure sensor output from the amplifier 10 to a digital value (hereinafter referred to as "pressure change rate") $dp/d\theta$, and stores the converted digital value in the buffer 12. Specifically, a pulse signal PLS1 (hereinafter referred to as "one-degree pulse"), having a crank angle period of one degree, is supplied to the A/D conversion block 11 from the pulse generation block 13. The cylinder pressure sensor output is sampled at the intervals of the one-degree pulse PLS1 and converted to a digital value. The digital value is then stored in the buffer 12.

A pulse signal PLS6, having a crank angle period of six degrees, is supplied to the CPU 14 from the pulse generation block 13. The CPU 14 performs a process for reading the digital value stored in the buffer 12 at intervals of the six-degree pulse PLS6. That is, in the present embodiment, the A/D conversion block 11 does not request an interrupt from the CPU 14, but the CPU 14 does perform the reading process at intervals of the six-degree pulse PLS6.

The input circuit 17 converts the detection signals from various sensors to digital values and supplies the digital values to the CPU 14. An engine rotational speed NE is calculated from the time period of the six-degree pulse PLS6. A demand torque TRQ of the engine 1 is calculated according to the operation amount AP of the accelerator pedal.

The CPU 14 calculates a target intake air flow rate GACMD according to the engine operating condition and supplies a duty control signal for controlling an opening of the EGR valve 27 to the EGR valve 27 through the output circuit 18. The duty control signal is generated wherein the detected air flow rate GA coincides with the target intake air flow rate GACMD.

Figure 3:
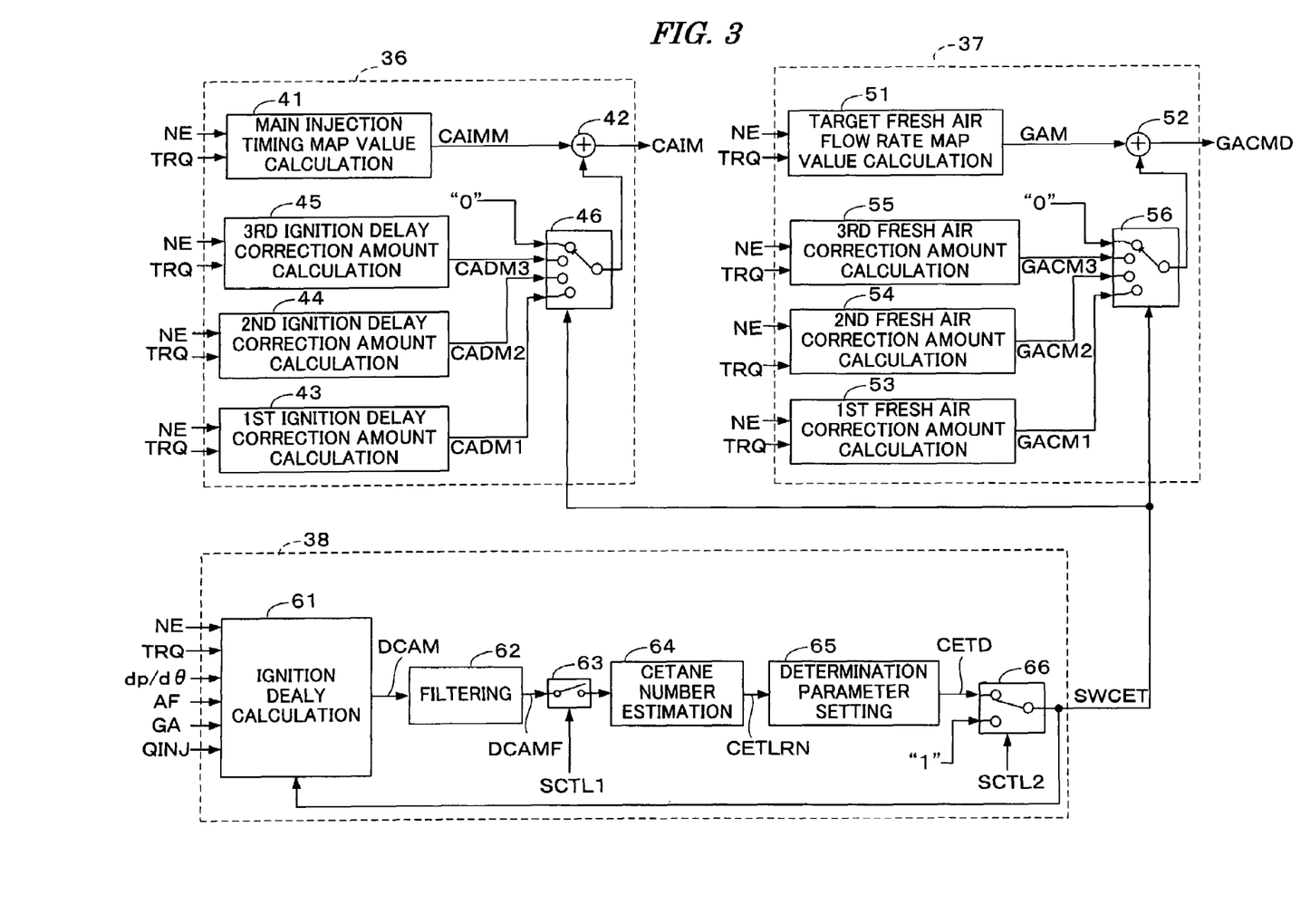
FIG. 3 is a block diagram illustrating a configuration of a module for calculating a main injection timing (CAIM) and a target intake air flow rate (GACMD)

FIG. 3 is a block diagram illustrating a configuration of a module which calculates a main injection timing CAIM of the fuel injection valve 6 and the target intake air flow rate GACMD. The function of the module is realized by the processes executed by the CPU 14.

The opening of the EGR valve 27 is controlled wherein the intake air flow rate GA detected by the intake air flow rate sensor 31 converges to the target intake air flow rate GACMD. As such, the recirculation amount of exhaust gases is controlled to the target exhaust gas recirculation amount.

The module of FIG. 3 includes a main injection timing calculation block 36 for calculating the main injection timing CAIM, a target intake air flow rate calculation block 37 for calculating the target intake air flow rate GACMD, and a cetane number switching signal generation block 38 for estimating a cetane number CET of the fuel being used and outputting a cetane number switching signal SWCET according to the estimated cetane number CET.

In this embodiment, the cetane number of the fuel in use is determined to be any one of a first cetane number CET1 (for example, 41), a second cetane number CET2 (for example, 46), a third cetane number CET3 (for example, 51), or a fourth cetane number CET4 (for example, 57), contemplating the cetane numbers of the fuels distributed in the market. The fuel injection timing and the exhaust gas recirculation are controlled according to the determined cetane number. The cetane number switching signal SWCET takes values of "1" to "4" corresponding to the first to fourth cetane numbers CET1 to CET4.

The main injection timing calculation block 36 includes a main injection timing map value calculation block 41; an adding block 42; first, second, and third ignition delay correction amount calculation blocks 43, 44, and 45; and a switching block 46.

The main injection timing map value calculation block 41 retrieves a CAIMM map which is previously set according to the engine rotational speed NE and the demand torque TRQ to calculate a main injection timing map value CAIMM. The CAIMM map is set based on the fuel of the above-described fourth cetane number CET4.

The first ignition delay correction amount calculation block 43 retrieves a CADM1 map which is previously set according to the engine rotational speed NE and the demand torque TRQ to calculate a first ignition delay correction amount CADM1. The CADM1 map is set based on the fuel of the above-described first cetane number CET1.

The second ignition delay correction amount calculation block 44 retrieves a CADM2 map which is previously set according to the engine rotational speed NE and the demand torque TRQ to calculate a second ignition delay correction amount CADM2. The CADM2 map is set based on the fuel of the above-described second cetane number CET2.

The third ignition delay correction amount calculation block 45 retrieves a CADM3 map which is previously set according to the engine rotational speed NE and the demand torque TRQ to calculate a third ignition delay correction amount CADM3. The CADM3 map is set based on the fuel of the above-described third cetane number CET3.

The switching block 46 selects any one of the correction amounts CADM1-CADM3, or "0" according to the cetane number switching signal SWCET. Specifically, if SWCET is equal to "1", the first ignition delay correction amount CADM1 is selected; if SWCET is equal to "2", the second ignition delay correction amount CADM2 is selected; if SWCET is equal to "3", the third ignition delay correction amount CADM3 is selected; and if SWCET is equal to "4", "0" is selected. It is not necessary to correct the main injection timing map value CAIMM when the cetane number of the fuel being used is the fourth cetane number CET4. Accordingly, "0" is selected. Since the ignition delay correction amount increases as the cetane number of the fuel decreases, the relationship of CADM1>CADM2>CADM3 is satisfied when the engine operating condition is the same.

The target intake air flow rate calculation block 37 includes a target fresh air flow rate map value calculation block 51; an adding block 52; first, second, and third fresh air correction amount calculation blocks 53, 54, and 55; and a switching block 56.

The target fresh air flow rate map value calculation block 51 retrieves a GAM map which is previously set according to the engine rotational speed NE and the demand torque TRQ to calculate a target fresh air flow rate map value GAM. The GAM map is set based on the fuel of the fourth cetane number CET4.

The first fresh air correction amount calculation block 53 retrieves a GACM1 map which is previously set according to the engine rotational speed NE and the demand torque TRQ to calculate a first fresh air correction amount GACM1. The GACM1 map is set based on the fuel of the first cetane number CET1.

The second fresh air correction amount calculation block 54 retrieves a GACM2 map which is previously set according to the engine rotational speed NE and the demand torque TRQ to calculate a second fresh air correction amount GACM2. The GACM2 map is set based on the fuel of the second cetane number CET2.

The third fresh air correction amount calculation block 55 retrieves a GACM3 map which is previously set according to the engine rotational speed NE and the demand torque TRQ to calculate a third fresh air correction amount GACM3. The GACM3 map is set based on the fuel of the third cetane number CET3.

The switching block 56 selects any one of the correction amounts GACM1-GACM3 or "0" according to the cetane number switching signal SWCET. Specifically, if SWCET is equal to "1", the first fresh air correction amount GACM1 is selected; if SWCET is equal to "2", the second fresh air correction amount GACM2 is selected; if SWCET is equal to "3", the third fresh air correction amount GACM3 is selected; and if SWCET is equal to "4", "0" is selected. It is not necessary to correct the target fresh air flow rate map value GAM when the cetane number of the fuel being used is the fourth cetane number CET4. Accordingly, "0" is selected. Since the fresh air correction amount increases as the cetane number of the fuel decreases, the relationship of GACM1>GACM2>GACM3 is satisfied when the engine operating condition is the same.

The cetane number switching signal generation block 38 includes an ignition delay calculation block 61, a filtering block 62, switching blocks 63 and 66, a cetane number estimation block 64, and a determination parameter setting block 65.

Figure 4:
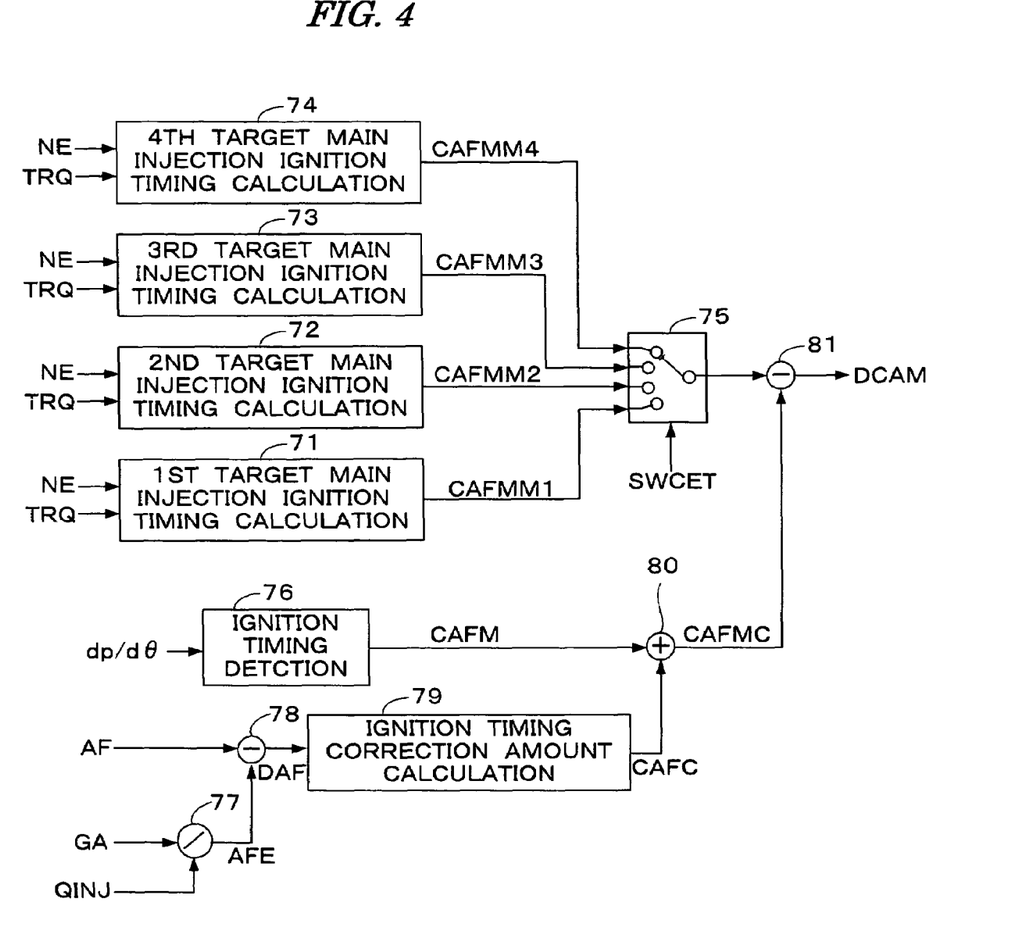
FIG. 4 is a block diagram illustrating a configuration of the ignition delay calculation block illustrated in FIG. 3.

As illustrated in FIG. 4, the ignition delay calculation block 61 includes a first target main injection ignition timing calculation block 71, a second target main injection ignition timing calculation block 72, a third target main injection ignition timing calculation block 73, a fourth target main injection ignition timing calculation block 74, a switching block 75, an ignition timing detection block 76, a dividing block 77, a subtracting block 78, an ignition timing correction amount calculation block 79, an adding block 80, and a subtracting block 81.

The first target main injection ignition timing calculation block 71 retrieves a CAFMM1 map which is previously set according to the engine rotational speed NE and the demand torque TRQ to calculate a first target main injection ignition timing CAFMM1. The CAFMM1 map is set based on the fuel of the first cetane number CET1.

The second target main injection ignition timing calculation block 72 retrieves a CAFMM2 map which is previously set according to the engine rotational speed NE and the demand torque TRQ to calculate a second target main injection ignition timing CAFMM2. The CAFMM2 map is set based on the fuel of the second cetane number CET2.

The third target main injection ignition timing calculation block 73 retrieves a CAFMM3 map which is previously set according to the engine rotational speed NE and the demand torque TRQ to calculate a third target main injection ignition timing CAFMM3. The CAFMM3 map is set based on the fuel of the third cetane number CET3.

The fourth target main injection ignition timing calculation block 74 retrieves a CAFMM4 map which is previously set according to the engine rotational speed NE and the demand torque TRQ to calculate a fourth target main injection ignition timing CAFMM4. The CAFMM4 map is set based on the fuel of the fourth cetane number CET4.

The switching block 75 selects any one of the target main injection ignition timings CAFMM1-CAFMM4 according to the cetane number switching signal SWCET. Specifically, if SWCET is equal to "1", the first target main injection ignition timing CAFMM1 is selected; if SWCET is equal to "2", the second target main injection ignition timing CAFMM2 is selected; if SWCET is equal to "3", the third target main injection ignition timing CAFMM3 is selected; and if SWCET is equal to "4", the fourth target main injection ignition timing CAFMM4 is selected. Since the target main injection ignition timing retards as the cetane number of the fuel decreases, the relationship of CAMM1<CAFMM2<CAFMM3<CAFMM4 is satisfied when the engine operating condition is the same.

The ignition timing detection block 76 detects a main injection ignition timing CAFM according to the pressure change rate $dp/d\theta$ obtained by converting the output signal of the cylinder pressure sensor 2 to a digital value. The detection method thereof will be described later with reference to FIGS. 8-10.

The dividing block 77 divides the intake air flow rate GA by the fuel injection amount QINJ per unit time period to calculate an estimated air-fuel ratio AFE. The subtracting block 78 calculates an air-fuel ratio difference DAF (=AF−AFE) between the detected air-fuel ratio AF calculated from the oxygen concentration detected by the oxygen concentration sensor 32 and the estimated air-fuel ratio AFE.

The ignition timing correction amount calculation block 79 retrieves a CAFC table (not shown) according to the air-fuel ratio difference DAF to calculate an ignition timing correction amount CAFC. The CAFC table is set based on the data obtained when the air-fuel ratio is in a steady state, wherein the ignition timing correction amount CAFC increases as the air-fuel ratio difference DAF increases.

The adding block 80 adds the ignition timing correction amount CAFC with the detected main injection timing CAFM to calculate the corrected main injection timing CAFMC. The subtracting block 81 subtracts the corrected main injection timing CAFMC from the target main injection timing output from the switching block 75 to calculate the ignition delay angle DCAM.

Figure 5:
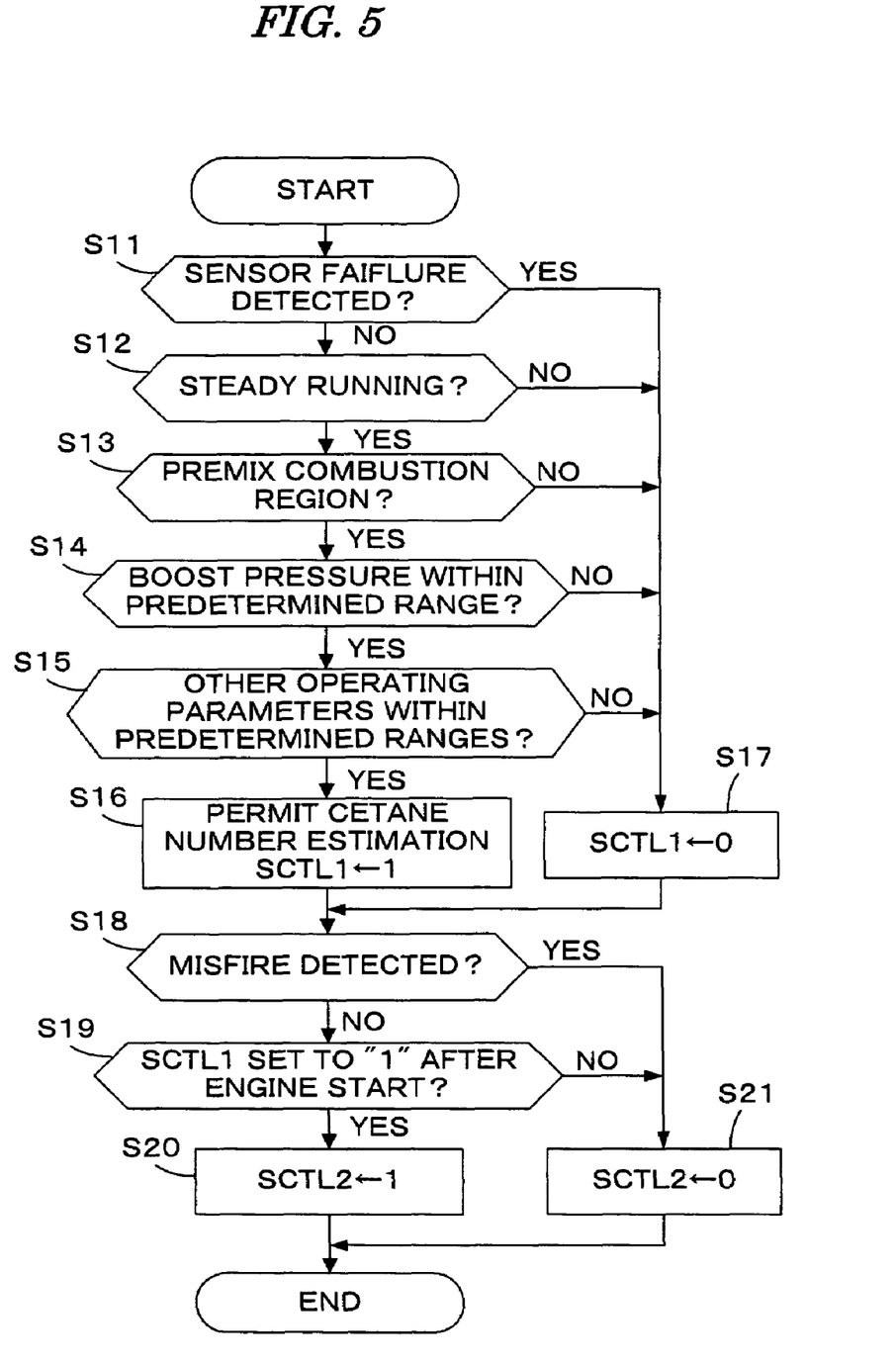
FIG. 5 is a flowchart of a process for setting switching control signals (SCTL1, SCTL2) illustrated in FIG. 3.

Returning to FIG. 3, the filtering block 62 performs a filtering by the least-squares method calculation or the moving averaging calculation of data of the ignition delay angle DCAM obtained in a comparatively long time period (e.g., 10-60 seconds) to calculate a filtered ignition delay angle DCAMF.

The switching block 63 is on/off controlled by a first switching control signal SCTL1 which is set in the process of FIG. 5 described below. Specifically, the switching block 63 is turned off when the first switching control signal SCTL1 is equal to "0" and turned on when the first switching control signal SCTL1 is equal to "1". The first switching control signal SCTL1 is set to "1" when an execution condition of the cetane number estimation is satisfied.

Figure 11:
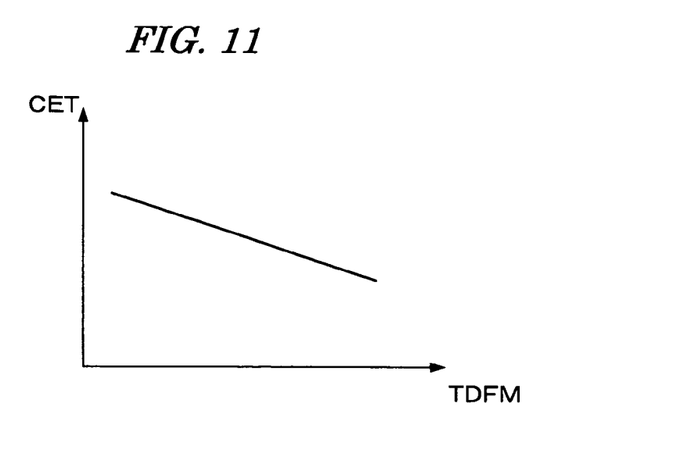
FIG. 11 illustrates a table used for calculating a cetane number (CET) from an ignition delay time period (TDFM)

The cetane number estimation block 64 converts the ignition delay angle DCAMF to an ignition delay time period TDFM using the engine rotational speed NE and retrieves a CET table illustrated in FIG. 11 according to the ignition delay time period TDFM to calculate the cetane number CET. The cetane number estimation block 64 applies the cetane number CET to the following equation (1) to calculate a cetane number learning value CETLRN:

$$\text{CETLRN} = \alpha \times \text{CET} + (1-\alpha) \times \text{CETLRN} \tag{1}$$

where $\alpha$ is an averaging coefficient set to a value between "0" and "1", and the CETLRN on the right side is a preceding calculated value.

When refueling, the cetane number learning value CETLRN is initialized to the first cetane number CET1 that corresponds to the minimum value among cetane numbers of the fuels distributed in the market and converges to the value indicative of the cetane number of the fuel in use by the subsequent learning. By initializing to the first cetane number CET1, even the fuel of the worst ignitionability (flammability) is assured of igniting during a cold start of the engine when using the cetane number learning value CETLRN in the fuel injection timing control described below.

The cetane number learning value CETLRN described above is calculated using all of the cylinder pressure sensor outputs corresponding to four cylinders. Therefore, an averaging of the cetane number CET detected for each cylinder and the cetane numbers CET whose detection timings are different from each other is performed by the above-described equation (1). When the cetane number estimation process is not executed, the newest cetane number learning value CETLRN of the stored learning values is output from the cetane number estimation block 64.

The determination parameter setting block 65 determines the cetane number of the fuel being used is either the first cetane number CET1, the second cetane number CET2, the third cetane number CET3, or the fourth cetane number CET4 according to the cetane number learning value CETLRN. When the determined cetane number is the first cetane number CET1, a determined cetane number parameter CETD is set to "1". The determined cetane number parameter CETD is set to "2" when the determined cetane number is the second cetane number CET2. The determined cetane number parameter CETD is set to "3" when the determined cetane number is the third cetane number CET3. The determined cetane number parameter CETD is set to "4" when the determined cetane number is the fourth cetane number CET4.

Figure 7:
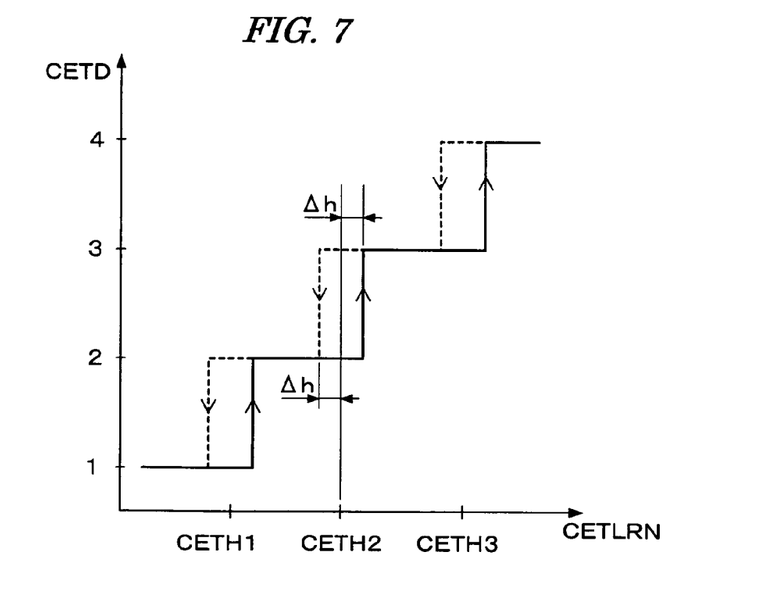
FIG. 7 is a graph illustrating a setting method of a determined cetane number parameter (CETD) according to a cetane number learning value (CETLRN)

Specifically, as illustrated in FIG. 7, the cetane number learning value CETLRN is compared with first, second, and third threshold values CETH1, CETH2, and CETH3 with the hysteresis. That is, if a parameter (hereinafter referred to as "hysteresis parameter") for adding the hysteresis is indicated by "Δh", the determined cetane number parameter CETD is changed to "3" when the determined cetane number parameter CETD is equal to "2" and the cetane number learning value CETLRN exceeds the value obtained by adding the hysteresis parameter Δh to the second threshold value CETH2. Further, the determined cetane number parameter CETD is changed to "2" when the determined cetane number parameter CETD is equal to "3" and the cetane number learning value CETLRN becomes lower than the value obtained by subtracting the hysteresis parameter Δh from the second threshold value CETH2. With respect to the first and third threshold values CETH1 and CETH3, a similar determination is made to set the determined cetane number parameter CETD.

The switching block 66 is switched by a second switching control signal SCTL2, which is set in the process of FIG. 5 described below. In the switching block 66, if the second switching control signal SCTL2 is "0", "1" is selected. If the second switching control signal SCTL2 is "1", the determined cetane number parameter CETD is selected. The selected parameter is output as the cetane number switching signal SWCET.

Next, the setting of the first switching control signal SCTL1 and the second switching control signal SCTL2 is explained with reference to FIG. 5. The switching control signal setting process illustrated in FIG. 5 is executed at predetermined time intervals in the CPU 14.

In step S11, it is determined whether a failure of any one of the sensors, that is, the crank angle position sensor 3, the accelerator sensor 21, the cylinder pressure sensor 2, the intake air flow rate sensor 31, and the oxygen concentration sensor 32, that are necessary for the cetane number estimation process, is detected.

If the answer to step S11 is affirmative (YES), the first switching control signal SCTL1 is set to "0" (step S17). If no failure of the sensors is detected, it is determined whether the vehicle driven by the engine 1 is running in the steady running state (step S12).

If the vehicle is running in the steady running state, it is determined whether the operating condition of the engine 1 is in the premix combustion region (step S13).

The premix combustion means a combustion in which the injected fuel burns after a delay time period has elapsed from the time of actual fuel injection. For example, the region with hatching illustrated in FIG. 6, i.e., the region defined by the demand torque TRQ below the predetermined torque TRQ1 (for example, 60 Nm) and the engine rotational speed NE in the range from a first predetermined rotational speed NE1 (for example, 1200 rpm) to a second predetermined rotational speed NE2 (for example, 2300 rpm) is the premix combustion region.

Figure 6:
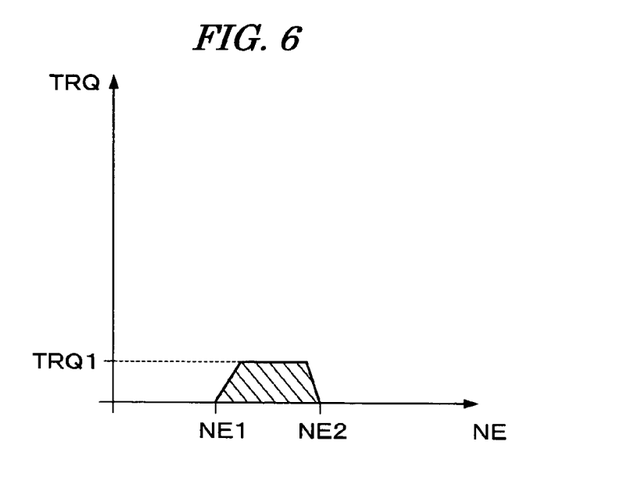
FIG. 6 is a graph illustrating a premix combustion region.

In the premix combustion region, the change in the ignition timing caused by a change in the cetane number of fuel becomes comparatively large. Therefore, the cetane number is accurately estimated based on the ignition delay.

If the answer to step S13 is affirmative (YES), it is determined whether the boost pressure PB is within a predetermined range, for example, within the range of ±5 percent of the target pressure value (step S14). If the answer to step S14 is affirmative (YES), it is determined whether other engine operating parameters are within predetermined ranges which are determined corresponding to each engine operating parameter. For example, it is determined whether the detected fresh air flow rate GA is within the range of ±5 percent of its target value, whether the air-fuel ratio AF detected by the oxygen concentration sensor is within the range of ±5 percent of its target value, whether an opening of a swirl valve (not shown) is within the range of ±5 percent of its target value, and whether the fuel pressure PF is within the range of ±5 percent of its target value.

If all of the operating parameters are in the predetermined ranges, the execution condition of the cetane number estimation is determined to be satisfied, and the first switching control signal SCTL1 is set to "1" (step S16). When the first switching control signal SCTL1 is set to "1", the switching block 63 is turned on and the cetane number estimation according to the ignition delay angle DCAM is performed.

If any one of the answers to steps S12-S15 is negative (NO), the process proceeds to step S17 in which the first switching control signal SCTL1 is set to "0".

In step S18, it is determined whether a misfire of the engine 1 is detected. The misfire detection is performed as follows in this embodiment: A maximum value DPMAX (hereinafter referred to as "maximum pressure change rate") of the pressure change rate dp/dθ, obtained from the output of the cylinder pressure sensor, is detected; a predetermined ratio RTH (for example, 0.6) is multiplied by a preceding value of the maximum pressure change rate DPMAX to calculate a change rate threshold value DPMAXTH; and it is determined whether the maximum pressure change rate DPMAX is less than the change rate threshold value DPMAXTH. Next, a ratio RERR (hereinafter referred to as "error ratio") of a number of times that the maximum pressure change rate DPMAX is less than the change rate threshold value DPMAXTH, with respect to the total number of times of the determination, is calculated. Then, it is determined that a misfire has occurred if the error ratio RERR exceeds a determination threshold value RERRTH (for example, 0.1).

The error ratio RERR correlates with a rate of change in the indicated mean effective pressure Pmi. Therefore, misfire is accurately determined by using the error rate RERR without calculating the indicated mean effective pressure Pmi.

The method for determining the misfire is not limited to the above-described method. Alternatively, an engine rotational speed change parameter indicative of a change in the engine rotational speed may be calculated, and a determination is made that a misfire has occurred when the engine rotational speed change parameter exceeds a predetermined threshold value.

If a misfire is detected, the process proceeds from step S18 to step S21, in which the second switching control signal SCTL2 is set to "0". If no misfire is detected, it is determined whether the switching control signal SCTL1 has been set to "1" after start of the engine (step S19). If the answer to step S19 is negative (NO), the process proceeds to step S21. If the answer to step S19 is affirmative (YES), the second switching control signal SCTL2 is set to "1".

When the second switching control signal SCTL2 is "0", the cetane number switching signal SWCET is maintained at "1". Accordingly, the first ignition delay correction amount CADM1, the first fresh air correction amount GACM1, and the first target main injection ignition timing CAFMM1 are applied. That is, when a misfire occurs, or when the cetane number estimation process has not been executed at all after starting of the engine, the control corresponding to the fuel of the lowest cetane number is performed. Thereby, a significant delay of the fuel injection timing, or a misfire is prevented.

Figure 8:
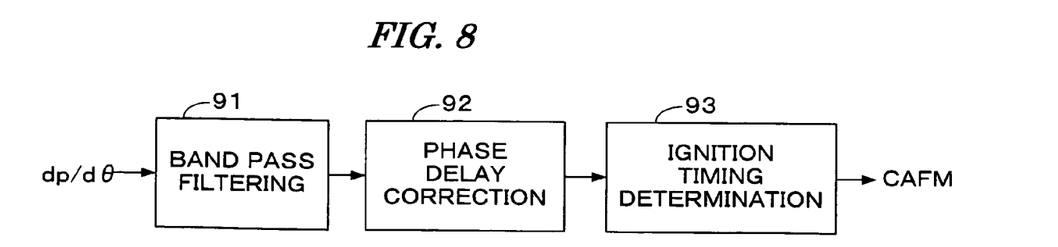
FIG. 8 is a block diagram illustrating a configuration of an ignition timing detection block illustrated in FIG. 4.
Figure 9:
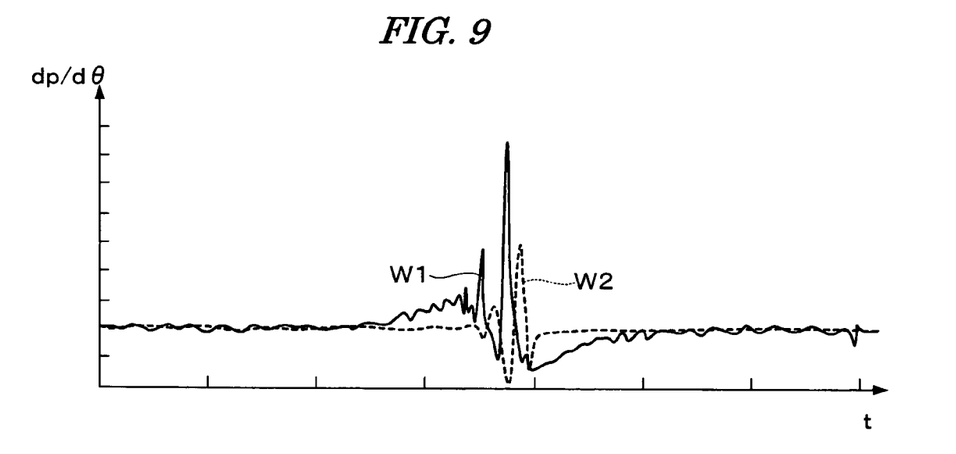
FIG. 9 is a time chart illustrating a band-pass filtering of a cylinder pressure sensor output.

FIG. 8 is a block diagram illustrating a configuration of the ignition timing detection block 76 illustrated in FIG. 4. The ignition timing detection block 76 includes a band-pass filtering block 91, a phase delay correction block 92, and an ignition timing determination block 93. The pressure change rate dp/dθ output from the cylinder pressure sensor 2 is input to the band-pass filtering block 91. In FIG. 9, the waveform W1 indicates an input waveform and the waveform W2 indicates an output waveform. The phase delay, which occurs in the band-pass filtering block 91, is corrected in the phase delay correction block 92.

Figures 10A, 10B, 10C:
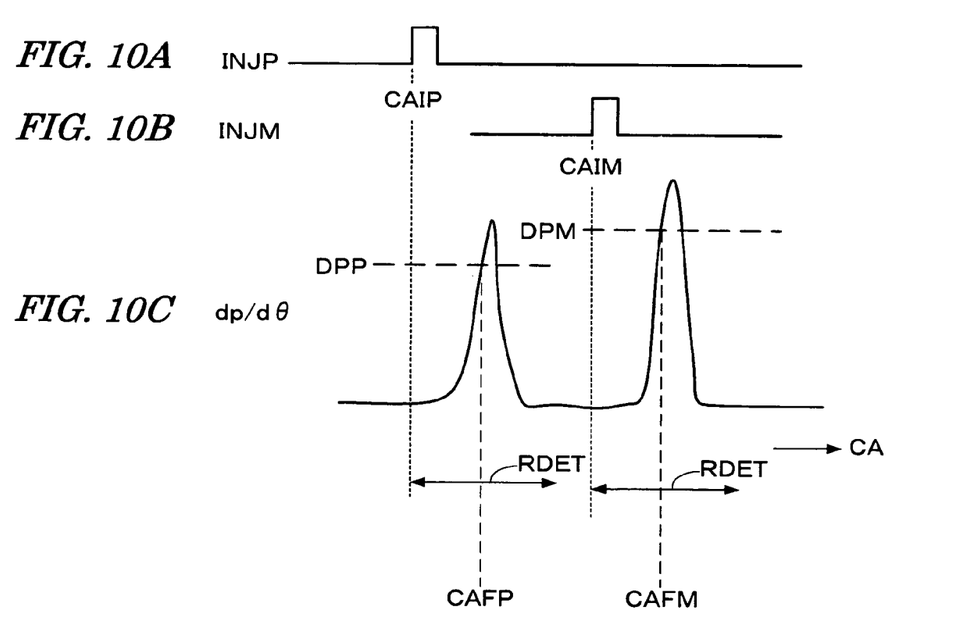
FIGS. 10A-10C are time charts illustrating a detecting method of an ignition timing.

The ignition timing determination block 93 determines a crank angle position CAFP (hereinafter referred to as "pilot injection ignition timing") at which the pressure change rate dp/dθ takes a peak value corresponding to the pilot injection and a crank angle position CAFM (hereinafter referred to as "main injection ignition timing") at which the pressure change rate dp/dθ takes another peak value corresponding to the main injection. Specifically, as illustrated in FIG. 10C, the crank angle position, at which the pressure change rate dp/dθ output from the phase delay correction block 92 exceeds a pilot detection threshold value DPP, is determined to be the pilot injection ignition timing CAFP; and the crank angle position, at which the pressure change rate dp/dθ exceeds a main detection threshold value DPM, is determined to be the main injection ignition timing CAFM. In this embodiment, only the main injection ignition timing CAFM is used for estimating the cetane number CET.

In FIGS. 10A and 10B, a pilot injection pulse INJP started from a crank angle position CAIP and a main injection pulse INJM started from a crank angle position CAIM are illustrated. FIG. 10C illustrates an angle position range RDET (for example, 10 degrees) where the ignition timings CAFP and CAFM are detected. By limiting the detection angle position range RDET to a comparatively narrow range as illustrated in FIG. 10C, the ignition timing is accurately determined without increasing the calculation load on the CPU 14.

Figure 12:
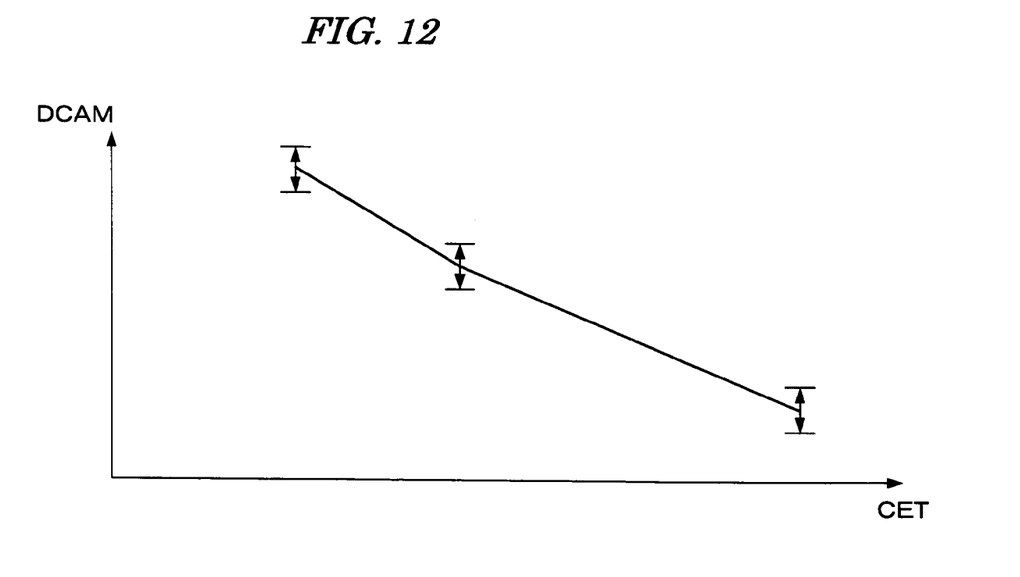
FIG. 12 illustrates a relationship between the cetane number (CET) of fuel and the ignition delay angle (DCAM)

FIG. 12 illustrates a relationship between the cetane number CET of fuel and the ignition delay angle DCAM. In FIG. 12, the ranges indicated by the arrows correspond to error ranges of the ignition delay angle DCAM. The error of the ignition delay angle DCAM is generated due to the deviation of the actual air-fuel ratio from the target value caused by the detection error of the intake air amount sensor 31, or by the error of the fuel injection amount.

In this embodiment, the ignition timing correction amount CAFC is calculated according to the air-fuel ratio AF detected by the oxygen concentration sensor 32, and the ignition timing CAFM detected in the ignition timing detection block 76 is corrected with the ignition timing correction amount CAFC. Therefore, the calculation accuracy of the ignition delay angle DCAM is improved. Consequently, the estimation accuracy of the cetane number is improved.

Figure 13:
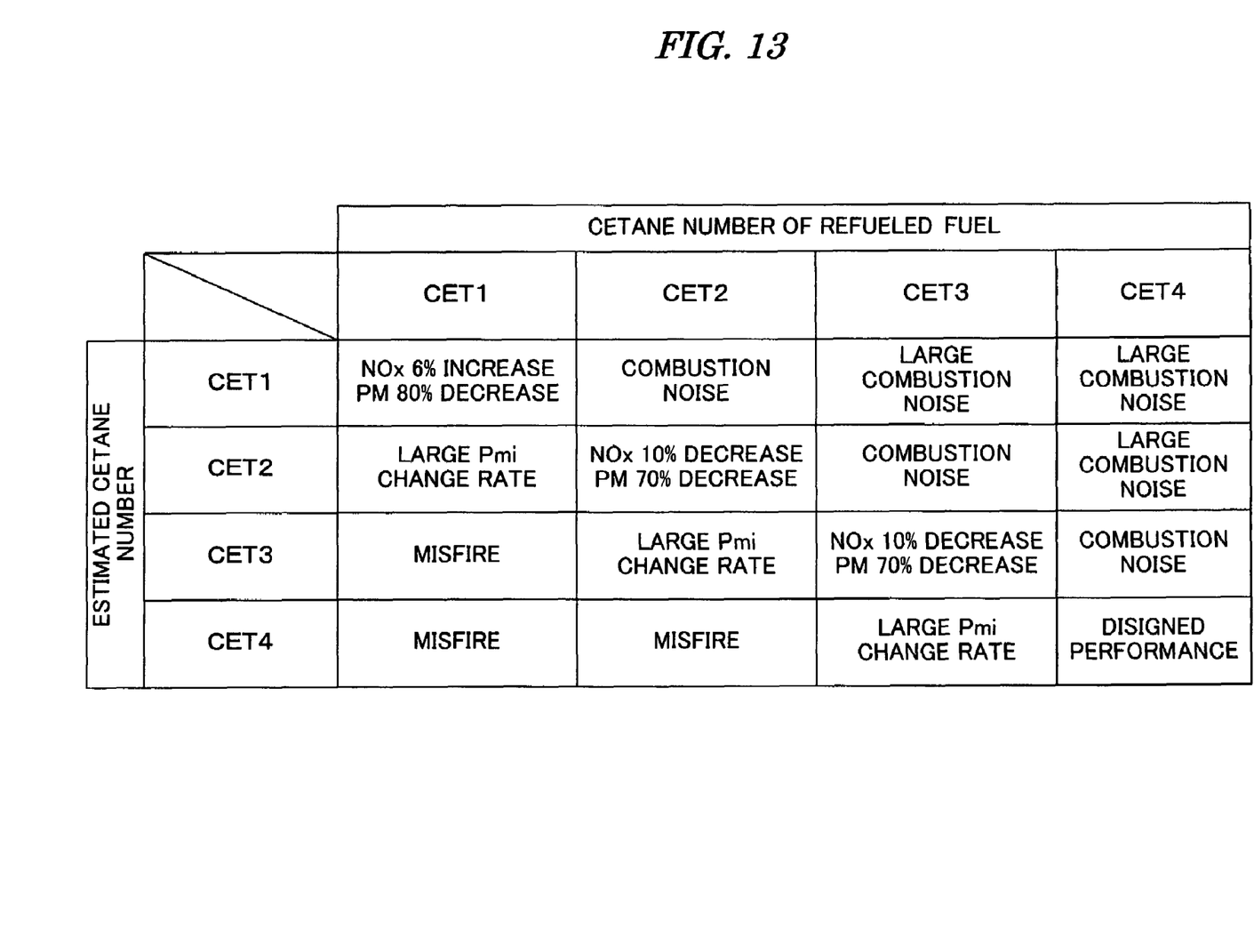
FIG. 13 is a chart used to explain engine performance corresponding to the combination of the cetane number of the refueled fuel and the estimated cetane number.

FIG. 13 illustrates how the engine operating characteristic changes depending on the relationship between the cetane number of the refueled fuel and the estimated cetane number. In a condition where the cetane number of the fuel in use is the fourth cetane number CET4 and the estimated cetane number is also the fourth cetane number CET4 (hereinafter referred to as "base condition"), the engine is operated with the designed engine performance.

In contrast, if the cetane number of the fuel in use is the third cetane number CET3 and the estimated cetane number is also the third cetane number CET3, the emission amount of NOx decreases by 10 percent, and the emission amount of PM (particulate matter) decreases by 70 percent as compared with the base condition.

If the cetane number of the fuel in use is the second cetane number CET2 and the estimated cetane number is also the second cetane number CET2, the emission amount of NOx decreases by 10 percent, and the emission amount of PM (particulate matter) decreases by 70 percent as compared with the base condition.

If the cetane number of the fuel in use is the first cetane number CET1 and the estimated cetane number is also the first cetane number CET1, the emission amount of NOx increases by 6 percent and the emission amount of PM (particulate matter) decreases by 80 percent as compared with the base condition. The above-described characteristics correspond to the conditions that are located on the diagonal line of the table in FIG. 13.

The pressure change rate dp/dθ increases and the combustion noise increases as the combination of the cetane number of the fuel in use and the estimated cetane number deviates upward from the diagonal line. For example, if the cetane number of the fuel in use is the third cetane number CET3 and the estimated cetane number is the second cetane number CET2, the pressure change rate dp/dθ slightly increases. If the cetane number of the fuel in use is the third cetane number CET3 and the estimated cetane number is the first cetane number CET1, the pressure change rate dp/dθ further increases and the combustion noise becomes relatively large.

On the other hand, changes in the combustion state (Pmi change rate) increase as the combination of the cetane number of the fuel in use and the estimated cetane number deviates downward from the diagonal line. For example, if the cetane number of the fuel in use is the second cetane number CET2 and the estimated cetane number is the third cetane number CET3, the Pmi change rate slightly increases. If the cetane number of the fuel in use is the second cetane number CET2 and the estimated cetane number is the fourth cetane number CET4, the Pmi change rate further increases and a misfire occurs.

Therefore, by accurately estimating the cetane number of the fuel in use, the influence of any difference in the cetane number is suppressed to the minimum, thereby operating the engine with the designed engine performance.

As described above, in this embodiment, the target ignition timing is calculated using any one of a plurality of the target ignition timing maps, i.e., the CAFMM1 map-CAFMM4 map, which store the target ignition timings set according to the demand torque TRQ and the engine rotational speed NE. The actual ignition timing CAFM is detected and the ignition delay angle DCAM of the actual ignition timing CAFM, with respect to the target ignition timing, is calculated.

Further, the cetane number learning value CETLRN is calculated according to the ignition delay angle DCAM. The determined cetane number parameter CETD is calculated according to the cetane number learning value CETLRN. Also, the target ignition timing maps are switched according to the determined cetane number parameter CETD.

In this embodiment, since the fresh air correction amounts GACM1-GACM3 and "0" are switched according to the determination cetane number parameter CETD, the ignition delay time period changes depending on the switching. Therefore, by switching a plurality of the target ignition timing maps according to the determination cetane number parameter CETD, the cetane number estimation is performed using the target ignition timing most suitable for the fuel in use. Consequently, the cetane number is quickly estimated with comparatively little operation load.

Further, the ignition delay correction amount is calculated using any one of a plurality of the ignition delay correction amount maps, i.e., the CADM1 map-CADM3 map, which store the fuel injection timing correction amounts set according to the demand torque TRQ and the engine rotational speed NE. A plurality of the ignition delay correction amount maps are switched according to the determined cetane number parameter CETD. Also, the fuel injection is executed at the fuel injection timing corrected by the ignition delay correction amount.

By switching a plurality of the ignition delay correction amount maps according to the determination cetane number parameter CETD, the cetane number estimation is performed using the ignition delay correction amount most suitable for the fuel in use. Consequently, the fuel injection control according to the estimated cetane number is appropriately performed with comparatively little operation load.

Further, the detected ignition timing CAFM is corrected based on the air-fuel ratio AF of the air-fuel mixture in the combustion chamber detected by the output of the oxygen concentration sensor 32. Since the detected actual ignition timing CAFM includes a detection error due to a difference in the air-fuel ratio, a more accurate actual ignition timing is obtained by correcting the detected ignition timing based on the air-fuel ratio.

In this embodiment, the fuel injection valve 6 corresponds to the fuel injection means, the crank angle position sensor 3 and the accelerator sensor 33 correspond to the operating condition detecting means, and the ECU 4 corresponds to the fuel injection control means, the target ignition timing storing means, the target ignition timing calculating means, the cetane number estimating means, the target ignition timing switching means, the fuel injection timing correction amount storing means, the fuel injection timing correction amount calculating means, and the fuel injection timing correction amount switching means.

Specifically, the CAFMM1-CAFMM4 maps correspond to the target ignition timing storing means, the CADM1-CADM3 maps correspond to the fuel injection timing correction amount storing means, and the first through fourth target main injection ignition timing calculation blocks 71-74 correspond to the target ignition timing calculating means.

Further, the cylinder pressure sensor 2, the ignition timing detection block 76, the dividing block 77, the subtracting block 78, the ignition timing correction amount calculation block 79, and the adding block 80 correspond to the ignition timing detecting means. The subtracting block 81, the filtering block 62, the switching block 63, the cetane number estimation block 64, the determination parameter setting block 65, and the switching block 66 correspond to the cetane number estimating means. The switching block 75 corresponds to the target ignition timing switching means.

The first through third ignition delay correction amount calculation blocks 43-45 correspond to the fuel injection timing correction amount calculating means. The switching block 46 corresponds to the fuel injection timing correction amount switching means. The main injection timing map value calculation block 41 and the adding block 42 correspond to the fuel injection control means.

The present invention is not limited to the embodiment described above, and various modifications may be made. For example, in the above-described embodiment, the cetane number is estimated based on the main injection ignition timing CAFM corresponding to the main injection. Alternatively, the cetane number estimation may be performed based on the pilot injection ignition timing CAFP corresponding to the pilot injection. Further, the pilot injection timing may be corrected according to the estimated cetane number.

Further, in the above-described embodiment, the cylinder pressures in all cylinders are detected to calculate the cetane number learning value CETLRN. Alternatively, only one cylinder pressure sensor may be disposed at a specific cylinder, and the cetane number learning value CETLRN may be calculated based on the cylinder pressure (pressure change rate) detected by the cylinder pressure sensor.

In the above-described embodiment, an example of the 4-cylinder diesel internal combustion engine is shown. The present invention can be applied to a diesel internal combustion engine having another number of cylinders, or to a watercraft propulsion engine, such as an outboard engine having a vertically extending crankshaft.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A control system for an internal combustion engine having fuel injection means provided in a combustion chamber of the engine for injecting fuel into the combustion chamber, the control system comprising:
   operating condition detecting means for detecting an operating condition of the engine;
   fuel injection control means for determining a fuel injection timing according to the detected engine operating condition, and executing a fuel injection through the fuel injection means;
   a plurality of target ignition timing storing means for storing target compression ignition timings of the fuel injected into the combustion chamber, the target compression ignition timings being set according to the operating condition of the engine;
   ignition timing detecting means for detecting an actual compression ignition timing of the fuel injected into the combustion chamber;
   target ignition timing calculating means for calculating the target compression ignition timing using the plurality of target ignition timing storing means;
   cetane number estimating means for calculating an ignition delay of the actual compression ignition timing with respect to the target compression ignition timing, and estimating a cetane number of the fuel according to the calculated ignition delay; and
   target ignition timing switching means for switching the target ignition timing storing means to be used by the target ignition timing calculating means according to the estimated cetane number.

2. The control system according to claim 1, further comprising:
   a plurality of fuel injection timing correction amount storing means for storing correction amounts of the fuel injection timing, the correction amounts being set according to the operating condition of the engine;
   fuel injection timing correction amount calculating means for calculating the correction amount of the fuel injection timing using the fuel injection timing correction amount storing means; and
   fuel injection timing correction amount switching means for switching the fuel injection timing correction amount storing means to be used by the fuel injection timing correction amount calculating means according to the estimated cetane number, wherein the fuel injection control means executes the fuel injection at the fuel injection timing corrected with the correction amount calculated by the fuel injection timing correction amount calculating means.

3. A control system for an internal combustion engine having fuel injection means provided in a combustion chamber of the engine for injecting fuel into the combustion chamber, the control system comprising:

operating condition detecting means for detecting an operating condition of the engine;

fuel injection control means for determining a fuel injection timing according to the detected engine operating condition, and executing a fuel injection through the fuel injection means;

target ignition timing storing means for storing target compression ignition timings of the fuel injected into the combustion chamber, the target compression ignition timings being set according to the operating condition of the engine;

ignition timing detecting means for detecting an actual compression ignition timing of the fuel injected into the combustion chamber;

target ignition timing calculating means for calculating the target compression ignition timing using the target ignition timing storing means;

cetane number estimating means for calculating an ignition delay of the actual compression ignition timing with respect to the target compression ignition timing, and estimating a cetane number of the fuel according to the calculated ignition delay;

a plurality of fuel injection timing correction amount storing means for storing correction amounts of the fuel injection timing, the correction amounts being set according to the operating condition of the engine;

fuel injection timing correction amount calculating means for calculating the correction amount of the fuel injection timing using the fuel injection timing correction amount storing means; and fuel injection timing correction amount switching means for switching the fuel injection timing correction amount storing means to be used by the fuel injection timing correction amount calculating means according to the estimated cetane number, wherein the fuel injection control means executes the fuel injection at the fuel injection timing corrected with the correction amount calculated by the fuel injection timing correction amount calculating means.

4. The control system according to claim 1, wherein the ignition timing detecting means corrects the actual compression ignition timing based on an air-fuel ratio of an air-fuel mixture in the combustion chamber.

5. The control system according to claim 3, wherein the ignition timing detecting means corrects the actual compression ignition timing based on an air-fuel ratio of an air-fuel mixture in the combustion chamber.

6. A control method for an internal combustion engine having at least one fuel injection valve provided in a combustion chamber of the engine for injecting fuel into the combustion chamber, the control method comprising the steps of:

a) detecting an operating condition of the engine;

b) determining a fuel injection timing according to the detected engine operating condition;

c) executing a fuel injection through the at least one fuel injection valve;

d) detecting an actual compression ignition timing of the fuel injected into the combustion chamber;

e) retrieving one of a plurality of target ignition timing maps according to the detected operating condition of the engine to calculate a target compression ignition timing of the fuel injected into the combustion chamber, the plurality of target ignition timing maps being set according to the operating condition of the engine;

f) calculating an ignition delay of the actual compression ignition timing with respect to the target compression ignition timing; and g) estimating a cetane number of the fuel according to the calculated ignition delay, wherein the target ignition timing map to be used in the step e) is switched according to the estimated cetane number.

7. The control method according to claim 6, further comprising the steps of:

h) switching a plurality of fuel injection timing correction amount maps according to the estimated cetane number to select one fuel injection timing correction amount map, the plurality of fuel injection timing correction amount maps storing correction amounts of the fuel injection timing and being set according to the operating condition of the engine; and i) retrieving the selected fuel injection timing correction amount map according to the detected operating condition of the engine to calculate a correction amount of the fuel injection timing, wherein the fuel injection is executed at the fuel injection timing corrected with the calculated correction amount.

8. A control method for an internal combustion engine having at least one fuel injection valve provided in a combustion chamber of the engine for injecting fuel into the combustion chamber, the control method comprising the steps of:

a) detecting an operating condition of the engine;

b) determining a fuel injection timing according to the detected engine operating condition;

c) executing a fuel injection through the at least one fuel injection valve;

d) detecting an actual compression ignition timing of the fuel injected into the combustion chamber;

e) retrieving a target ignition timing map according to the detected operating condition of the engine to calculate a target compression ignition timing of the fuel injected into the combustion chamber, the target ignition timing map being set according to the operating condition of the engine f) calculating an ignition delay of the actual compression ignition timing with respect to the target compression ignition timing;

g) estimating a cetane number of the fuel according to the calculated ignition delay;

h) switching a plurality of fuel injection timing correction amount maps according to the estimated cetane number to select one fuel injection timing correction amount map, the plurality of fuel injection timing correction amount maps storing correction amounts of the fuel injection timing and being set according to the operating condition of the engine; and i) retrieving the selected fuel injection timing correction amount map according to the detected operating condition of the engine to calculate a correction amount of the fuel injection timing; and j) correcting the fuel injection timing with the calculated corrected amount, wherein the fuel injection is executed at the corrected fuel injection timing.

9. The control method according to claim 6, wherein the actual compression ignition timing is corrected based on an air-fuel ratio of an air-fuel mixture in the combustion chamber.

10. The control method according to claim 8, wherein the actual compression ignition timing is corrected based on an air-fuel ratio of an air-fuel mixture in the combustion chamber.

* * * * *